United States Patent Office
3,635,998
Patented Jan. 18, 1972

3,635,998
2-BENZOXAZOLYL N-METHYL-N-NAPHTHYL-DITHIOCARBAMATE
Alex Berg, Hans Eberhardt, Hans Machleidt, Alexander Wildfeuer, and Hanns Goeth, Biberach an der Riss, Germany, assignors to Boehringer Ingelheim G.m.b.H., Ingelheim am Rhein, Germany
No Drawing. Filed May 7, 1969, Ser. No. 822,731
Claims priority, application Germany, May 13, 1968, P 17 70 402.8
Int. Cl. C07d
U.S. Cl. 260—307      1 Claim

ABSTRACT OF THE DISCLOSURE 2-benzoxazolyl N - methyl-N-naphthyl-dithiocarbamate of the formula

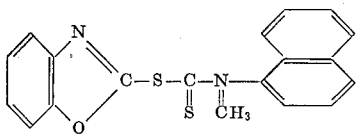

useful as an antimycotic.

This invention relates to 2-benzoxazolyl N-methyl-N-naphthyl-dithiocarbamate, as well as to methods of preparing this compound.

More particularly, the present invention relates to the novel compound 2-benzoxazolyl N-methyl-N-naphthyl-dithiocarbamate of the formula

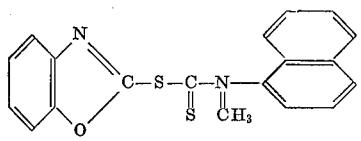

(I)

The compound of the present invention may be prepared by a number of different methods involving well known chemical principles, among which the following have proved to be particularly convenient and efficient:

Method A

By reacting a salt, preferably an alkali metal salt, of 2-mercapto-benzoxazole of the formula

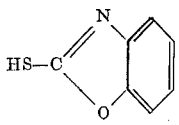

(II)

with an N-methyl-N-naphthyl-thiocarbamic acid halide of the formula

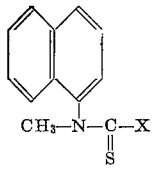

(III)

wherein X is halogen, preferably chlorine or bromine.

The reaction is advantageously carried out in the presence of an inert organic solvent and at a temperature between about room temperature and the boiling point of the particular solvent which is employed. Examples of suitable solvents are dimethylformamide and benzene.

Method B

By reacting N-methyl-α-naphthylamine of the formula

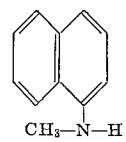

(IV)

with a (2-benzoxazolyl)-dithiocarbonic acid halide of the formula

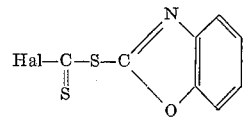

(V)

wherein Hal is halogen, preferably chlorine or bromine, in the presence of a hydrogen halide binding agent.

The reaction is advantageously performed in the presence of an organic solvent, preferably a chlorinated hydrocarbon, such as chloroform, and at a temperature between 0 and 50° C., preferably between 5 and 15° C. Examples of suitable hydrogen halide-binding agents are tertiary organic bases, such as triethylamine.

The starting compounds of the Formula III are prepared by reacting N-methyl-α-naphthylamine, for example, with thiophosgene in the presence of a tertiary organic base, such as triethylamine. The starting compounds of the Formulas II and IV are described in the literature.

A starting compound of the Formula V can be obtained, if X, for example, is chlorine, by reacting 2-mercapto-benzoxazol with thiophosgene in the presence of a strong base.

The following examples further illustrate the present invention and will enable others skilled in the art to understand it more completely. It should be understood, however, that the invention is not limited solely to the particularly examples given below.

EXAMPLE 1

Preparation of 2-benzoxazolyl N-methyl-N-α-naphthyl-dithiocarbamate by method A (a) N-methyl-N-α-naphthyl-thiocarbamic acid chloride.—A solution of 78.6 gm. of N-methyl-α-naphthylamine and 50.5 gm. of triethylamine in absolute ether was added dropwise to a solution of 36.5 cc. of thiophosgene in ether at a temperature of about 15° C. Thereafter, the mixed solution was stirred for 15 minutes, then filtered, and the filtrate was evaporated to dryness. The residue was dissolved in dimethylformamide, and insoluble matter was filtered off. The filtrate was a solution of N-methyl-N-α-naphthyl-thiocarbamic acid chloride in dimethylformamide.

(b) Sodium salt of 2-mercapto-benzoxazole.—75 gm. of 2-mercapto-benzoxazole were added to a solution of 11.5 gm. of odium in 500 cc. of absolute ethanol, and the mixture was refluxed for ten minutes and then evaporated to dryness. The residue was the sodium salt of 2-mercapto-benzoxazole.

(c) 2-benzoxazolyl N-methyl-N-α-naphthyl-dithiocarbamate.—The sodium salt of 2-mercapto-benzoxazole was pulverized and added to the solution of N-methyl-N-α-naphthyl-thiocarbamic acid chloride in dimethylformamide in a molar ratio of 1:1, and the mixture was refluxed for 30 minutes. Thereafter, water was added to the reaction solution, whereby an oil separated out which was isolated; the oil crystallized upon standing at room temperature and was then recrystallized from ethanol, yielding whitish crystals having a melting point of 170–172° C. The crystalline product was identified to be 2-benzoxazolyl N-methyl-N-α-naphthyl-dithiocarbamate.

When benzene was used as the solvent for the evaporation residue in step (a) instead of dimethylformamide, and this benzene solution was used in place of the dimethylformamide solution in step (c), the reaction product remained dissolved in the organic phase, which was separated, filtered and evaporated to dryness. The residue, recrystallized from ethanol, also yielded whitish crystalline 2 - benzoxazolyl N-methyl-N-α-naphthyl-dithiocarbamate, M.P. 170–172° C.

EXAMPLE 2

Preparation of 2-benzoxazolyl N-methyl-N-α-naphthyl-dithiocarbamate by method B (a) (2-benzoxazolyl)-dithiocarbonic acid chloride.— A solution of 40 gm. of sodium hydroxide in 300 cc. of water was added dropwise over a period of 30 minutes at about 10° C. to a vigorously stirred mixture consisting of a suspension of 151 gm. of 2-mercapto-benzoxazole in chloroform to which 115 gm. of thiophosgene had been added. The resulting mixture was stirred for 15 minutes more, whereupon the chloroform phase was separated, washed twice with water, dried and evaporated to a volume of 200 cc., yielding a solution of (2-benzoxazolyl)-dithiocarbonic acid chloride in chloroform.

(b) 2-benzoxazolyl N-methyl-N-α-naphthyl-dithiocarbamate.—The chloroformic solution of (2-benzoxazolyl)-dithiocarbonic acid chloride was diluted with chloroform to a total volume of 1500 cc. and then, while stirring, a solution of 157 gm. of N-methyl-α-naphthylamine and 101 gm. of triethylamine in 200 cc. of chloroform was added dropwise over a period of one hour at 10° C. The mixed solution was then stirred for one hour more. Thereafter, ether was added to the reaction solution, and the triethylamine hydrochloride precipitated thereby was filtered off. The filtrate was evaporated, the residue was taken up in 600 cc. of ethanol, and the resulting solution was allowed to stand at room temperature for some time, whereby a crystalline product separated out which was collected and recrystallized from ethanol. The whitish crystalline product has a melting point of 170–172° C. and was identified to be 2-benzoxazolyl N-methyl-N-α-naphthyl-dithiocarbamate.

The compound according to the present invention, i.e. 2 - benzoxazolyl N-methyl-N-α-naphthyl-dithiocarbamate, has useful properties. More particularly, it is an effective antimycotic.

The antimycotic activity of the compound according to the present invention was ascertained in the absence of serum (w.o.S.) and in the presence of 10% of serum (w.S.) by means of plate-dilution assay and tube-dilution assay. The dermatophytes *Trichophyton mentagrophytes* (ATCC 9129) and *Trichophyton rubrum* (ATCC 10 218) were used as test organisms.

In the plate-dilution test the action of the compound was determined with regard to its ability to diffuse. The diameter of the zone of inhibition was measured in millimeters. Petri-dishes of 100 mm. of diameter were filled with 20 ml. of nutrient medium (Sabouraud agar) and inoculated with a drop (0.05 ml.) of adjusted organism-suspension.

Per plate-hole of 10 mm. of diameter 0.1 ml. of the corresponding compound-solution of certain concentrations were each pipetted in. The culture was incubated for seven days at 26° C., and then the minimum inhibition concentration needed to inhibit the growth of fungi was determined.

In the tube-dilution test, Sabouraud bouillon was used as liquid nutrient medium. Tubes were inoculated with two drops of an adjusted organism-suspension. The results were read macroscopically, registering the minimum inhibition concentration (MIC) after an incubation of seven days at 26° C.

The following results were obtained:

| Dermatophyte | Minimum inhibiting concentration | |
|---|---|---|
| | Plate-dilution test | Tube-dilution test |
| *Trichophyton mentagrophytes* ATCC 9129 | [1] 1:16,000 [2] 1:16,000 | 1:1.6 million. 1:100,000. |
| *Trichophyton rubrum* ATCC 10 218 | [1] 1:16,000 [2] 1:16,000 | 1:2 million. 1:100,000. |

[1] Without serum.
[2] With serum.

The suspension of organisms was adjusted for the plate- and tube-dilution test with a photometer and a barium sulfate comparison-solution.

Guinea pigs, the head-neck zone of which was depilitated, were infected in this zone with a dense suspension of *Trichophyton mentagrophytes*. The animals were treated for three weeks by applying daily approximately 1.0 ml. of a 2% solution of the compound according to this invention, which led to a complete healing of the mycotic efflorescences. The solvent was dimethylsulfoxide. No sensitization of the skin was observed.

The compound is non-toxic. After administration of 4000 mg./kg. per os to a group of 10 mice none of the animals died within 6 days. Peroral administration of an average daily dose of 61.4 mg./kg. over 42 days was easily tolerated by guinea pigs.

For antimycotic purposes on warm-blooded animals, the compound according to the present invention is applied topically as an active ingredient in customary pharmaceutical compositions, such as ointments, dusting powders and tinctures. The effective active ingredient content in such topical compositions is from 0.05 to 5% by weight, preferably 0.5 to 1% by weight.

The following examples illustrate a few topical compositions comprising the compound of the instant invention as an active antimycotic ingredient and represent the best mode contemplated of putting the invention to practical use. The parts are parts by weight unless otherwise specified.

EXAMPLE 3

Ointment

The ointment composition was compounded from the following ingredients:

| | Parts |
|---|---|
| 2-benzoxazolyl N-methyl-N-α-naphthyl-dithiocarbamate | 1.0 |
| Glycerin monostearate | 7.0 |
| Polyoxyethylene sorbitol monostearate | 4.0 |
| Isopropyl myristate | 5.0 |
| Cetyl stearyl alcohol | 7.0 |
| Distilled water | 76.0 |
| Total | 100.0 |

Compounding procedure

The glycerin monostearate, the polyoxyethylene sorbitol monostearate, the isopropyl myristate and the cetyl stearyl alcohol were each warmed to 70° C. and then stirred into the distilled water which had been heated to the same temperature, yielding an ointment base. The finely pulverized dithiocarbamate compound was stirred into a portion of the cold-stirred ointment base, and the resulting mixture was rolled and then blended into the remainder of the ointment base. The resulting ointment composition contained 1% by weight of the dithiocarbamate compound and, when topically applied to a fungus-infected skin area of a warm-blooded animal, produced very good antimycotic effects.

EXAMPLE 4

Dusting powder

The powder composition was compounded from the following ingredients:

|  | Parts |
|---|---|
| 2-benzoxazolyl N-methyl-N-α-naphthyl-dithiocarbamate | 0.5 |
| Talcum | 96.9 |
| Colloidal silicic acid | 2.5 |
| Perfume | 0.1 |
| Total | 100.0 |

Compounding procedure

The finely pulverized dithiocarbamate compound was intimately admixed with the other ingredients in a blender, and the mixture was pulverized in a mill. The resulting dusting powder contained 0.5% by weight of the dithiocarbamate compound and, when topically applied to a fungus-infected skin area of a warm-blooded animal, produced very good antimycotic effects.

EXAMPLE 5

Tincture

|  | Parts |
|---|---|
| 2-benzoxazolyl N-methyl-N-α-naphthyl-dithiocarbamate | 0.5 |
| Ethanol | 40.0 |
| Isopropanol | 39.3 |
| Methylene chloride | 10.0 |
| 1,2-propylene glycol | 10.0 |
| Perfume | 0.2 |
| Total | 100.0 |

Compounding procedure

The dithiocarbamate compound was dissolved by stirring in a liquid mixture consisting of the ethanol, the isopropanol and the methylene chloride. The solution was then admixed with the propylene glycol and the perfume. The resulting tincture contained 0.5% by weight of the dithiocarbamate compound and, when topically applied to a fungus-infected skin area of a warm-blooded animal, produced very good antimycotic effects.

The amount of active ingredient in Examples 3 to 6 may be varied within the concentration range set forth above, and the amounts and nature of the inert carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:

1. 2-benzoxazolyl N-methyl-N-α-naphthyl-dithiocarbamate of the formula

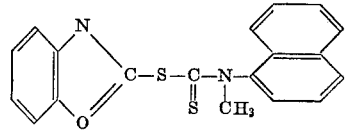

References Cited

UNITED STATES PATENTS 3,337,572  8/1967  Rilsheimer et al. ____ 260—304

OTHER REFERENCES

Tanner—C. A. 54, 18878h.

ALEX MAZEL, Primary Examiner

R. V. RUSH, Assistant Examiner

U.S. Cl. X.R.

424—272

UNITED STATES PATENT OFFICE
CERTIFICATE OF CORRECTION

Patent No. 3,635,998  Dated January 18, 1972

Inventor(s) Alex Berg, Hans Eberhardt, Hans Machleidt, Alexander Wildfeuer and Hanns Goeth It is certified that error appears in the above-identified patent and that said Letters Patent are hereby corrected as shown below:

Column 1, 1st formula, correct that part of the formula which reads  -N-    to read   -N-
                                                                      ‖              |
                                                                      CH$_3$          CH$_3$ Column 1, 2nd formula, correct that part of the formula which reads  -N-    to read   -N-
                                                                      ‖              |
                                                                      CH$_3$          CH$_3$ Column 2, line 57: change "odium" to read --sodium--;

Column 6, correct that part of the formula which read

Signed and sealed this 18th day of July 1972.

(SEAL)
Attest:

EDWARD M. FLETCHER, JR.
Attesting Officer

ROBERT GOTTSCHALK
Commissioner of Patents